T. J. W. Robertson,
Grinding and Cutting Glass, &c.

Nº 43,041. Patented June 7, 1864.

2 Sheets, Sheet 1.

Witnesses
A. E. Beach
S. F. Cohen

Inventor
T. J. W. Robertson

T. J. W. Robertson,
Grinding and Cutting Glass, &c.
Nº 43,041. Patented June 7, 1864.
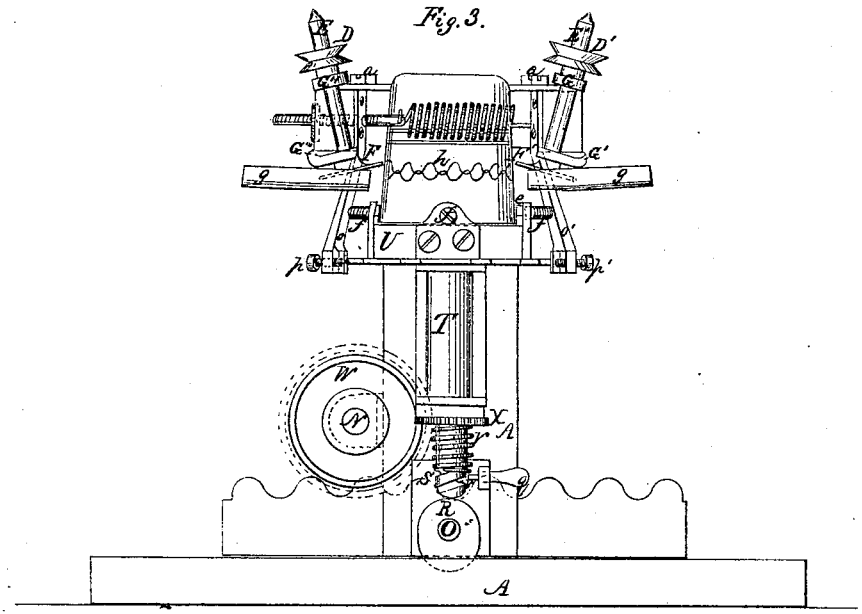
Fig. 4.
Fig. 5.
Fig. 6.
Fig. 7.
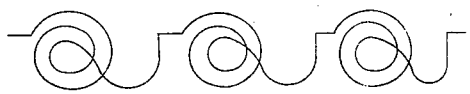
Fig. 8.
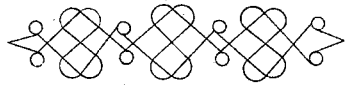
Fig. 9.
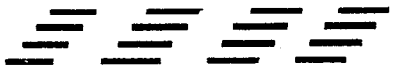
Fig. 10.
Fig. 11.
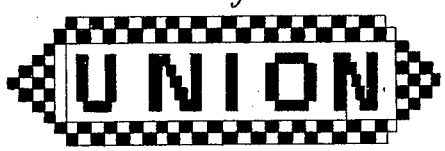
Witnesses
A. E. Beach
S. F. Cohen
Inventor
T. J. W. Robertson

UNITED STATES PATENT OFFICE.

T. J. W. ROBERTSON, OF NEW YORK, N. Y.

MACHINE FOR GRINDING, CUTTING, AND ENGRAVING GLASS.

Specification forming part of Letters Patent No. 43,041, dated June 7, 1864.

*To all whom it may concern:*

Be it known that I, T. J. W. ROBERTSON, of the city, county, and State of New York, have invented a new and useful Machine for Grinding, Cutting, Engraving, and Dressing Glass and Vitreous Substances; and I do hereby declare that the following is a full, clear, and exact description of the same, reference being had to the accompanying drawings, forming part of this specification, in which—

Figure 1:
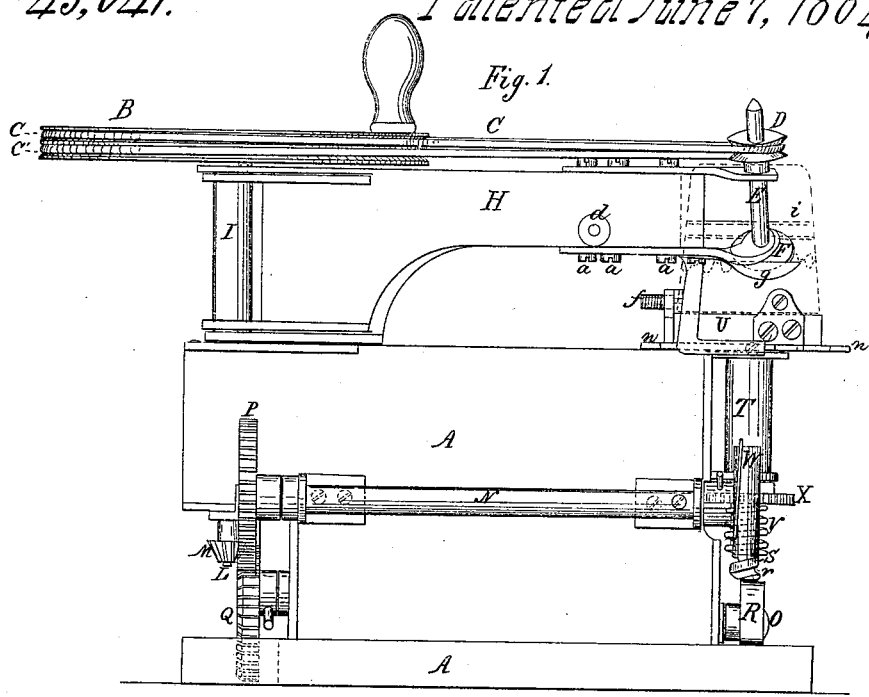
Figure 2:
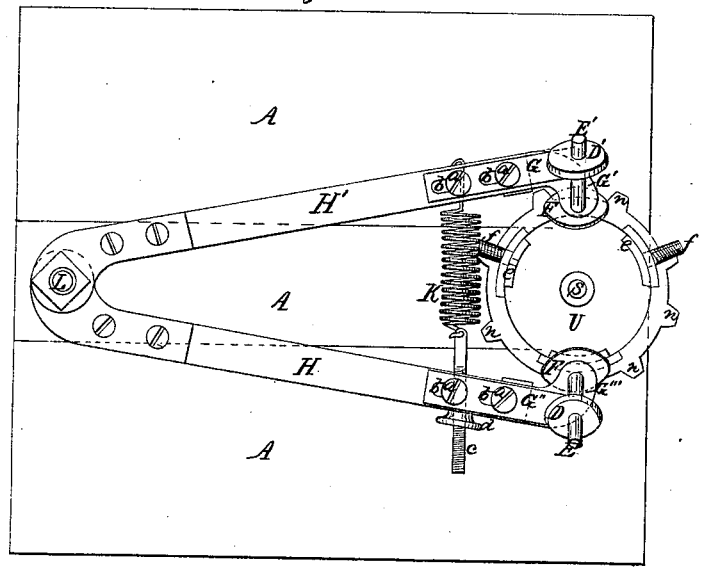

Figure 1 is a side view of my machine. Fig. 2 is a plan with the driving-wheel removed. Fig. 3 is an end view of the machine. Figs. 4, 5, 6, 7, 8, 9, 10, and 11 are specimens of various configurations that can be done upon a machine constructed according to my invention.

To enable those skilled in the art to which this invention pertains to make and use my machine, I will proceed to describe its construction and operation.

A A is the frame or stand of the machine. B is the driving-wheel, having two grooves turned in its face, for the two belts C C', which, passing around the two small pulleys D D' on the upper ends of shafts E E', impart motion to the cutting-wheels F F' on the lower ends of said shafts. The shafts E E' have bearings G G' G'' G''' attached to the arms H H' by screws $a\ a\ a$, passing through slots $b\ b$ in the bearings, so that the position of the cutting-wheels may be adjusted as desired. The arms H H' are attached to the sleeve I in such a manner as to allow the cutters F F' to have a motion to or from the center of the object to be operated upon, so as to accommodate the cutters to any irregularities in its size or shape. The cutters F F' are held to their work by the spiral spring K, which causes the cutters to bear upon the glass with a yielding pressure. One end of the spring is attached to the arm H', and the other end to a screw, $c$, passing through the arm H, and fastened there by the nut $d$, the object of this screw $c$ and nut $d$ being to provide an easy method of adjusting the amount of pressure to be given to the cutters to suit different styles of work. The driving-wheel B is attached to a shaft, L, which passes through the sleeve I, having a pinion, M, on its lower end, giving motion to the two shafts N O through the gear-wheels P Q. On the other end of shaft O there is an eccentric, R, giving motion in a vertical direction to the mandrel S, which passes through the sleeve T, and carries the chuck U. On the lower end of this mandrel there is a spiral spring, V, to keep it in constant contact with the eccentric R. This mandrel S is fitted in such a manner to the sleeve T as to allow it to have a rising and falling motion independent of the sleeve; at the same time, whenever the sleeve turns the mandrel must turn with it. The screw W on the end of the shaft N takes into a wheel, X, on the sleeve T, thus giving said sleeve a rotary motion. A chuck, U, is attached to the upper end of the mandrel S, which chuck clamps or holds the glass or other article to be operated on by inclosing it within the three jaws $e\ e\ e$, which are closed by the screws $f\ f\ f$. The glass is thus mounted upon the mandrel S, which may therefore be more properly denominated the "glass-carrier." The glass thus receives all the vertical and rotary movements which are imparted to the mandrel or carrier.

The machine is operated in the following manner: The operator having secured the glass or other article within the chuck U by the screws $f\ f\ f$, and having filled the two troughs $g\ g$ with a mixture of emery and oil or emery and water or other substance, imparts motion to the driving-wheel B, which gives motion to the cutters F F', the eccentric R, and the screw W. The cutters take up the emery mixture from the troughs $g\ g$, and, rubbing it on the glass, grind or cut away that portion of the glass with which the cutters are in contact while revolving.

It will be evident from the preceding description that as soon as the cutters F F' begin to operate on the glass the eccentric R and and screw W commence working also, giving the glass an up-and-down and rotary motion, at the same time causing each cutter to make a waving line; and these lines, by overlapping each other, cut the design indicated by $h$ upon the glass, as shown in the drawing at Fig. 3. By removing the eccentric R the glass will have a simple rotary motion, and each cutter will then cut a plain ring around the glass, as shown at $i$ in Fig. 1.

Instead of having a rotating cam, R, to impart the required vertical movement to the glass-holder, a strip of metal, either straight or curved, may be employed, having its edge made with undulations, as shown in red, Fig. 3. The undulating edge must be made to move along under the bottom of the glass-holder or mandrel, so that the extremity of the glass holder will rise and fall upon said undulating edge. If the screw W is removed, so that the eccentric R alone acts upon the mandrel S, the said mandrel, and with it the glass, will move up and down, and the cutters F F' will cut vertical lines upon the glass. By imparting to the glass these two motions simultaneously or at proper intervals a great variety of designs may be produced. Figs. 4, 5, 6, 7, and 8 are examples of some of the various designs which may be cut upon the glass by properly proportioning the motions produced by the screw W and the forms of the eccentric R. If very fine lines are required in the design, instead of the revolving cutters F F', two glaziers' diamonds may be attached to the arms H H'.

Another class of designs, consisting of a series of short lines or dots, is shown by Figs. 9, 10, and 11. This style of work is done by removing the eccentric R and allowing the screw W only to operate. This, as before shown, makes a plain ring around the glass with each cutter. These rings or lines are broken up into short lines and dots by the cams n n n n striking against the levers o o' on the arms H H', thus moving the cutters F F' away from the glass. The levers o o' are thrown into or out of contact with the cams n n n n by the screws p p'.

Instead of horizontal rings around the glass, spiral lines may be made by turning the screw q into the groove r, near the bottom of the mandrel S. This gives the glass a slight upward motion, which, combined with the rotation caused by the screw W, produces a spiral movement.

If the machine is intended to polish the design on ground glass, instead of grinding it on plain glass, lead wheels should be used in place of copper, and the troughs g g' should be filled with a mixture of oil and powdered tripoli, pumice-stone, rotten-stone, or any other polishing material.

I do not intend to limit myself to the precise form of machine here shown, as it may be varied in many different ways without changing the character of my invention.

Among other varieties of machines adapted to different styles of work, the following may be mentioned:

First. The machine may be so arranged that the mandrel S, screw W and eccentric R, or their equivalents, will occupy an inverse position, with respect to the glass, to that they now do, so that the glass may be underneath them, and revolving in a tank containing the grinding or polishing mixture, and six or more rotating cutters may encircle the glass, all acting upon the glass at once. These cutters may run as shown in the drawings, or they may be arranged with their shafts running in a horizontal position, if preferred.

Second. The revolving cutters F F' may be removed, and a fixed grinding device may be applied instead, such as a stick of the composition known as "emery vulcanite," which is a compound of emery and hard rubber. In this case it would be necessary for the glass to revolve in water, and to make many revolutions at a high speed, instead of only one revolution at a low speed. It might be advisable not to give any up-and-down motion to the glass in this method of working; but to produce the necessary design upon the glass a vertical motion might be given to the grinding apparatus.

Third. Another modification would be necessary for grinding the facets upon polygonal decanters, goblets, tumblers, &c. For this purpose one grindstone of a convenient size—say eighteen inches in diameter—might be substituted for the two or more cutters previously mentioned, and it should revolve in fixed bearings instead of yielding ones, as herein described, but the glass-holders should have the yielding bearings. Six, eight, ten, or any convenient number of decanters, goblets, or other articles can be arranged around this grindstone, each of which should be held against it by a self-acting device, having a spring, weight, or other equivalent yielding contrivance for pressing the glass against the grindstone; or a series of screws, turned by the driving mechanism, for feeding the glass gradually up to the stone, might be substituted for the yielding bearings. The glass-holders should be made with a scale, divided into as many parts as there are facets on the article to be ground or cut. After one facet has been ground to the proper shape, the glasses are all turned around, either by an automatic device or by the hand of the operator, to another division of the scale, when another facet is cut, and so on, until all the facets on the glasses are finished. The facets may be made of various shapes by giving the glass an intermittent motion across the face of the stone, according to the shape desired. After the facets are ground in this manner they are polished in the same kind of a machine; but in place of the grindstone a leaden or wooden wheel must be used, which should be supplied with the polishing mixture before mentioned.

Fourth. Another style suitable for engraving window-glass or other plane surfaces could be made by arranging a number of cutters in a row over a movable bed or table. This movable bed should be so arranged on ways that it might have motion given to it, either in a longitudinal or lateral direction, with cams so arranged as to produce the necessary motions for any required design. The glass should be laid flat upon the bed and fastened by clamping, or in any convenient manner; and as the bed is moved the glass will be acted upon by the cutters, producing a design according to the shape of the cams moving the bed.

Fifth. Another form of machine for flat glass could be made by using a wheel or drum five or six feet in diameter, having suitable clamps to hold the glass on its periphery, with a number of cutters, acting on the glass, arranged around it. Motion given to the wheel or drum would carry the glass along under the cutters, causing them to make a series of straight lines upon it. These lines can be broken up into short lines or dots by a series of cams acting on the cutters in the same manner as the cams $n$ $n$ $n$ $n$ act on the cutters in the model machine shown in the drawings, so as to lift them off the surface of the glass at longer or shorter intervals, according to the design intended to be produced; or, by passing the glass through the machine a second time, placing it at right angles to its former position, the lines first made may be recrossed by another set of lines, covering the glass with "diamonds."

An endless chain of beds—each bed forming a link or flat section in the chain and large enough to hold a pane of glass—might be substituted for the drum or wheel before described and receive motion from the main shaft, and thus carry the panes of glass successively under the cutters.

Having thus described my invention, what I claim as new in the art of grinding, cutting, engraving, and dressing glass, and desire to secure by Letters Patent, is—

1. The arrangement of the cutters or polishers to press with a yielding pressure against the surface of the glass, substantially as herein shown and described.

2. The combination of the cutters or polishers with swinging arms H H', substantially as herein shown and described.

3. The cutting, polishing, or forming of ornamental designs upon the glass by causing the cutters or polishers to press against the glass, and imparting to the glass during said pressure, by means of eccentrics or undulating surfaces, a combined or alternate vertical and rotary movement, substantially as herein shown and described.

T. J. W. ROBERTSON.

Witnesses:
L. F. COHEN,
A. E. BEACH.